United States Patent [19]

Marheine

[11] 4,007,333
[45] Feb. 8, 1977

[54] AUTOMATIC CALL TRANSMITTER OF THE DUAL TONE MULTIFREQUENCY TYPE

[75] Inventor: Edward A. Marheine, Brookfield, Wis.

[73] Assignee: GTE Automatic Electric Laboratories Incorporated, Northlake, Ill.

[22] Filed: May 31, 1974

[21] Appl. No.: 475,004

[52] U.S. Cl. .................. 179/6 D; 179/5 P; 179/90 BB
[51] Int. Cl.² ................. H04M 1/00; H04M 11/00
[58] Field of Search ....... 179/6 D, 5 R, 5.5, 90 BB, 179/5 P

[56] References Cited

UNITED STATES PATENTS

| | | | |
|---|---|---|---|
| 3,387,099 | 6/1968 | Fischer et al. | 179/90 BB |
| 3,510,598 | 5/1970 | Ballin et al. | 179/6 D |
| 3,536,853 | 10/1970 | Tate | 179/5 R |
| 3,595,999 | 7/1971 | Cole | 179/6 D |
| 3,710,024 | 1/1973 | Lacey | 179/6 D |

Primary Examiner—Raymond F. Cardillo, Jr.
Attorney, Agent, or Firm—Robert J. Black; David W. Heid

[57] ABSTRACT

An automatic call transmitter which uses a dual tone multifrequency generator first under the control of a pushbutton set to record, on a recording medium, a series of dual tones corresponding to a telephone number to be called, and which then uses this generator to regenerate pairs of voice frequencies corresponding to the recorded dual tones, under the control of switching means rendered frequency responsive by associated tuning means and selectively operated from the recorded tones upon playback to transmit the telephone number over a line. The automatic call transmitter may be in the form of a telephone reporting unit and the recording medium, such as an endless magnetic tape wound on a cartridge may also be used for recording and/or transmitting an oral message.

8 Claims, 4 Drawing Figures

AUTOMATIC CALL TRANSMITTER OF THE DUAL TONE MULTIFREQUENCY TYPE

BACKGROUND OF THE INVENTION

1. Field of the Invention

The invention relates to automatic call transmitters of the dual tone multifrequency type. More particularly the invention is concerned with telephone reporting sets or warning units of this type, however, the principles of the invention are also applicable to repertory dialing devices of the kind referred to.

With the advent of pushbutton dialing, or "Touch Calling," a need has arisen for devices which are capable of automatically dialing desired calling numbers in the dual tone multifrequency (DTMF) mode. In this form of signaling a pair of tones is transmitted over the line, one of which, in response to the depression of a pushbutton of the dial, is chosen from a high group and the other from a low group of frequencies within the voice frequency range. A circuit for such a "Touch Calling" dial is shown and described, for example, in U.S. Pat. No. 3,284,577 to Burns et al, entitled Substation Apparatus Employing a Multifrequency Signaling Arrangement.

Thus, taking the case, for example, of a telephone warning unit—in which, upon the occurrence of an unstandard condition or an emergency, a message identifying the condition and/or the originating location is to be automatically sent to a supervisory station or the like—it becomes desirable to arrange the unit for the transmission of the directory number of the last mentioned station in DTMF form if this is the signaling mode called for by the central office to which the warning unit is connected. To this end such units are equipped with a storage medium, for example of the magnetic variety, in which the desired directory number is initially recorded.

A somewhat similar situation exists in connection with repertory dialers, that is, telephone calling devices with a storage medium containing signaling information which corresponds to the telephone numbers of frequently called subscribers. While in this instance the transmission of an oral message is not needed, these devices, too, must be designed for the automatic transmission of the desired number in the DTMF mode if this is the kind of signaling required by the telephone line in question.

2. Description of the Prior Art

A repertory dialer with the aforementioned capability has been described, for example, in U.S. Pat. No. 3,128,351 to Hohmann Jr. et al. The repertory dialing device according to this patent uses as a storage medium a magnetic drum with a plurality of tracks corresponding in number to the directory number capacity of the repertory dialer. The dialer further has a dual tone multifrequency generator, which in a recording operation, is controlled by ten pushbuttons arranged in two horizontal rows and each of these pushbuttons has associated therewith two individual contacts for controlling the generator to generate a corresponding high voice frequency and a corresponding low voice frequency, respectively. In this manner a series of pushbutton depressions in accordance with a given directory number causes a corresponding series of frequency pairs to be recorded on the selected track of the drum. When the telephone number is to be called, that is during the playback operation, the prerecorded series of frequency pairs is picked up from the rotating drum by the associated magnetic head and, upon amplification, is directly transmitted out over the telephone line.

The technique disclosed in the Hohmann et al patent suffers from the disadvantage that, if the relative motion between the transducer and the recording medium upon playback departs from the motion used during recording, the signals picked up by the transducer have a frequency differing from the one the signals had at the time of recording. These frequency variations lead to the transmission of improper tones over the telephone line. Thus, in order to insure that the transmitted tones are of the proper frequency, a transport mechanism of extreme accuracy with respect to speed control and flutter characteristics would be required. Even though high precision components were used in combination with sophisticated frequency correcting arrangements and equipment for synchronizing recording speed with the read out speed, distortion would still occur and, under certain circumstances, this distortion would result in the transmission of spurious signals. Moreover, even though the above refinements could conceivably reduce distortion to an acceptable level, the additional expense involved would unduly detract from the commercial attractiveness of the device.

A number of alternative solutions have been proposed in all of which mere indicia representative of the dual tones, rather that these tones themselves, are recorded on a storage medium. In U.S. Pat. No. 3,243,517 to Miller et al, for example, a DTMF type pushbutton dial is used and when storage of a directory number on the recording medium—in this case a magnetic drum—is desired, the operation of the pushbutton dial results in the generation, by means of an additional set of pushbutton operated contacts mounted on the dial for this purpose, of a group of d.c. signals corresponding, in terms of a binary type code, to the digit dialed. A four-track recording head is used in conjunction with a cam shaft actuated mechanism for sweeping the head axially of the drum to apply the d.c. signal or signals to the drum and it is the presence or absence of a signal on each of the four parallel tracks that preserves the identity of the dialed digit. On read out the four-track head, again with the aid of the cam shaft actuated sweeping mechanism, simultaneously senses the presence or absence of the recorded d.c. signal indicia on each successive group of four-track parallel recordings. This information is then converted into the conventional two-out-of-seven DTMF code and is used to initiate the generation, by the dial oscillator, of conventional dual tone multifrequency tones for application to the telephone line.

Another of these alternative solutions is exemplified by the repertory dialer disclosed in Schenk U.S. Pat. No. 3,430,004. In this arrangement a single sequence of binary coded d.c. pulses is serially recorded, for each digit, on a magnetic belt under the control of a pushbutton set or keyboard designed to provide d.c. signals in a two-out-of-seven code. Complicated electronic circuitry is used to derive the sequence of binary coded d.c. pulses from these signals. This includes a row memory and a column memory in which the row and column signals received from the dial are converted to two 2-bit binary signals respectively identifying the row and column of the actuated pushbutton; a row comparator and a column comparator; a row code generator and a column code generator; a pulse generator; and a muting gate. In playback a special converter is required for converting the series of recorded, binary coded d.c. pulses to DTMF tones for transmission over the line. This special converter comprises, in addition to a dual tone multi-frequency generator proper and the aforementioned row and column code generators, a code detector as well as a row frequency selector and a column frequency selector.

In the repertory dialer shown in Fischer et al U.S. Pat. No. 3,385,934 the indicia representative of each dual tone is in the form of time-division modulated bursts of a single tone. More particularly the arrangement proposed in the Fischer et al patent uses a special pushbutton dial—again having an individual contact per pushbutton—in connection with an RC gating circuit to cause, by means of a single frequency oscillator, oscillatory bursts of varying time duration to be recorded on the recording medium. On playback a multi-track printed circuit commutator is used for translating the time division recording to a conventional two-out-of-seven-code which is used to control the operation of a DTMF oscillator.

From the foregoing description of the last-mentioned three patents it will be apparent that each of these alternative solutions requires equipment, either electronic or mechanical or both, of considerable complexity which greatly adds to the cost of manufacturing and maintaining the device and tends to detract from its reliability.

OBJECTS AND SUMMARY OF THE INVENTION

It is accordingly a primary object of the invention to provide an automatic call transmitter of the dual tone multifrequency type in which the dual tones themselves are recorded on the recording medium but which nevertheless is reliable in operation, simple in design and inexpensive to manufacture and maintain.

According to the invention the foregoing and other objects are met, briefly, but letting a dual tone multifrequency generator be controlled during recording from the contacts of a pushbutton set and during playback by the outputs of switching means, such as relays, which are rendered frequency responsive by associated tuning means, e.g. filters, and which are thus selectively operated in response to the prerecorded dual tones. Thus, on playback, each pair of frequencies picked up from the recording medium by the transducer is regenerated for transmission over the telephone line, by the dual tone multifrequency generator under the control of the corresponding pair of switching means. A conventional two-out-of-seven pushbutton dial of the type in which the pushbuttons are laid out in the form of a matrix and the pushbutton contacts are divided into two coordinate groups, for the selection of the high and low tone, respectively, can readily be used for this purpose with a minimum of adaptation.

The invention lends itself particularly well for use in connection with telephone reporting or warning units employing as a recording medium a magnetic tape, for example, an endless magnetic tape wound on a tape cartridge. In this case the series of dual tones required for later directing the call to a supervisory station can be prerecorded on the tape under the control of the dual tone multifrequency dial and subsequently an oral message can be recorded on the tape by means of a microphone. Upon playback, that is upon the occurrence of an unstandard condition, the prerecorded sequence of dual tones is then read by the switching means, implemented for example by seven relays connected in series with seven associated filters, and the dual tone multifrequency generator of the dial is then reused for regenerating the recorded series of dual tones under the control of these relays.

BRIEF DESCRIPTION OF THE DRAWINGS

An embodiment of the invention will be described below with reference to the accompanying drawings in which.

DETAILED DESCRIPTION

Apparatus of the Reporting Unit

Figure 1:
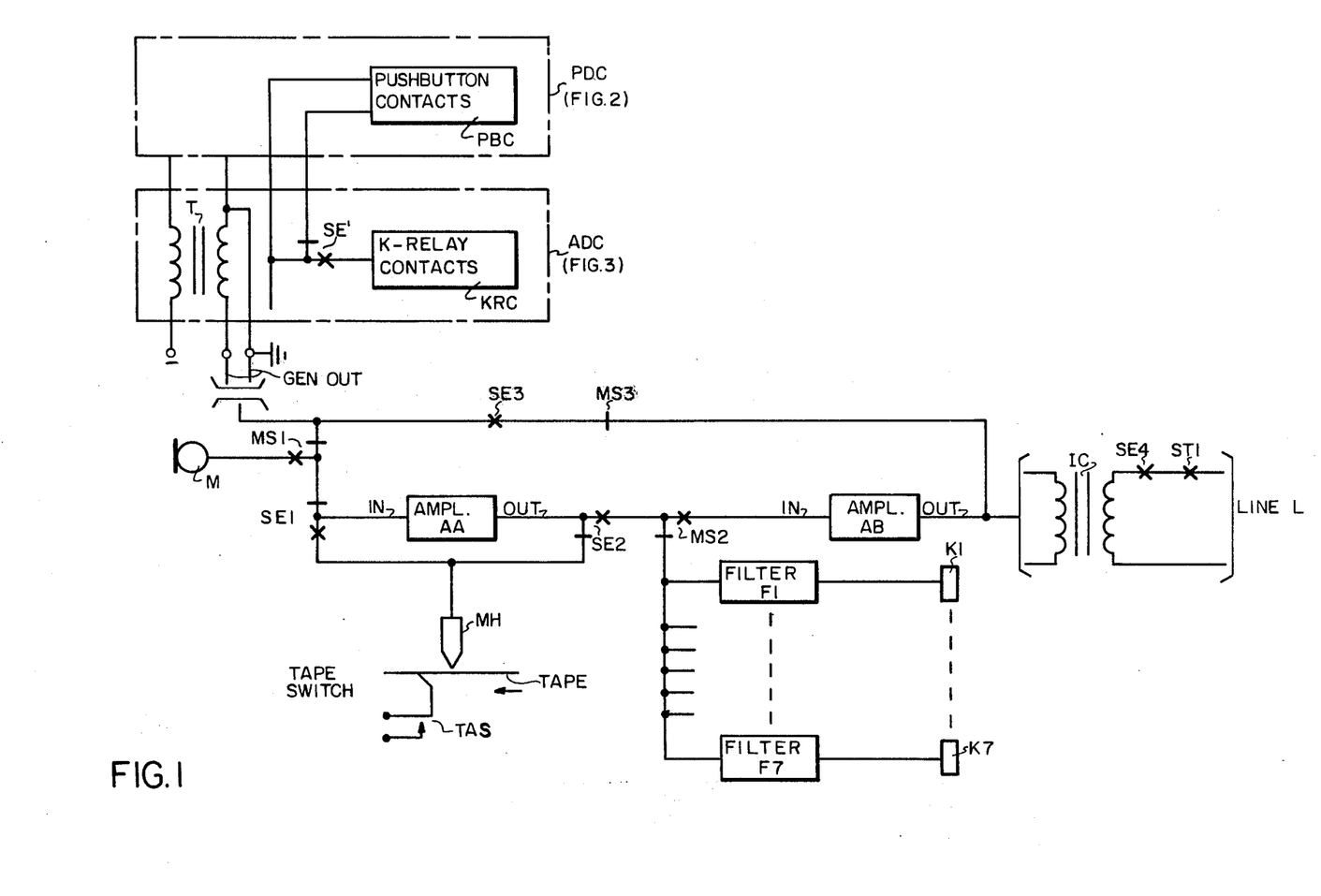
FIG. 1 is a largely one-line, block diagram of an automatic telephone reporting unit according to the invention.
Figure 2:
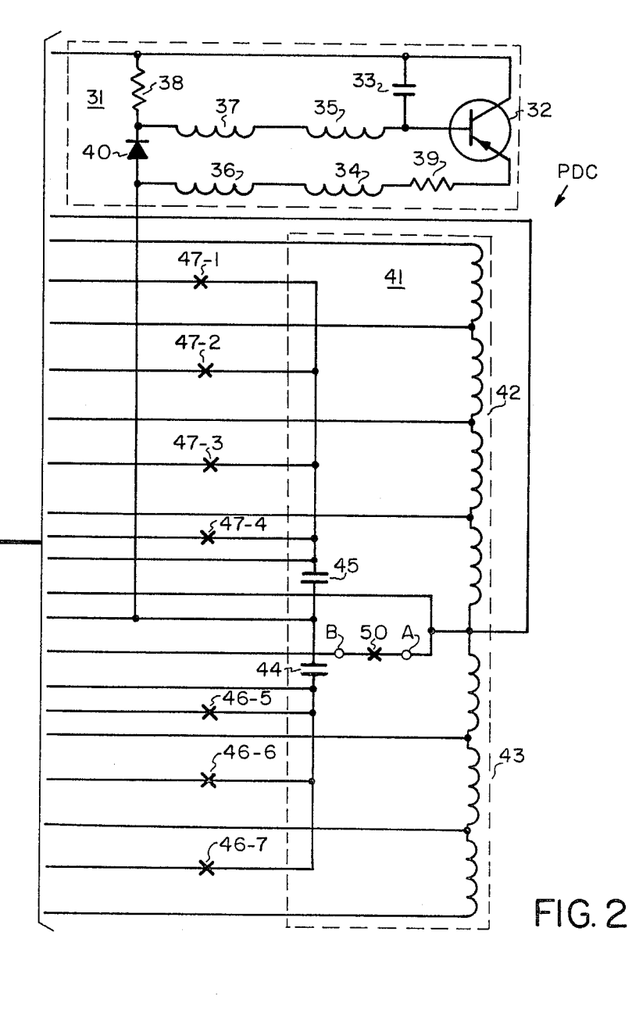
FIG. 2 shows the details of the pushbutton dial circuit, including the contacts of the pushbutton matrix controlling it.
Figure 3:
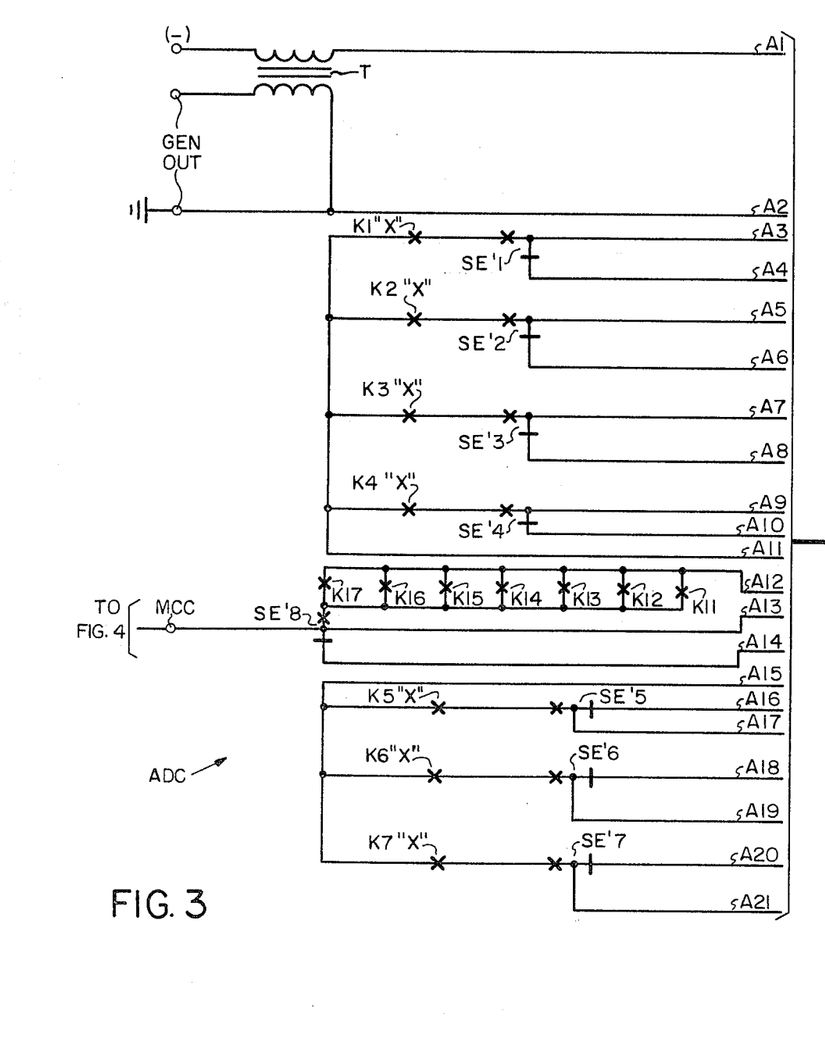
FIG. 3 shows an adapter circuit for supplementing the pushbutton dial circuit for the purpose of the present invention.
Figure 4:
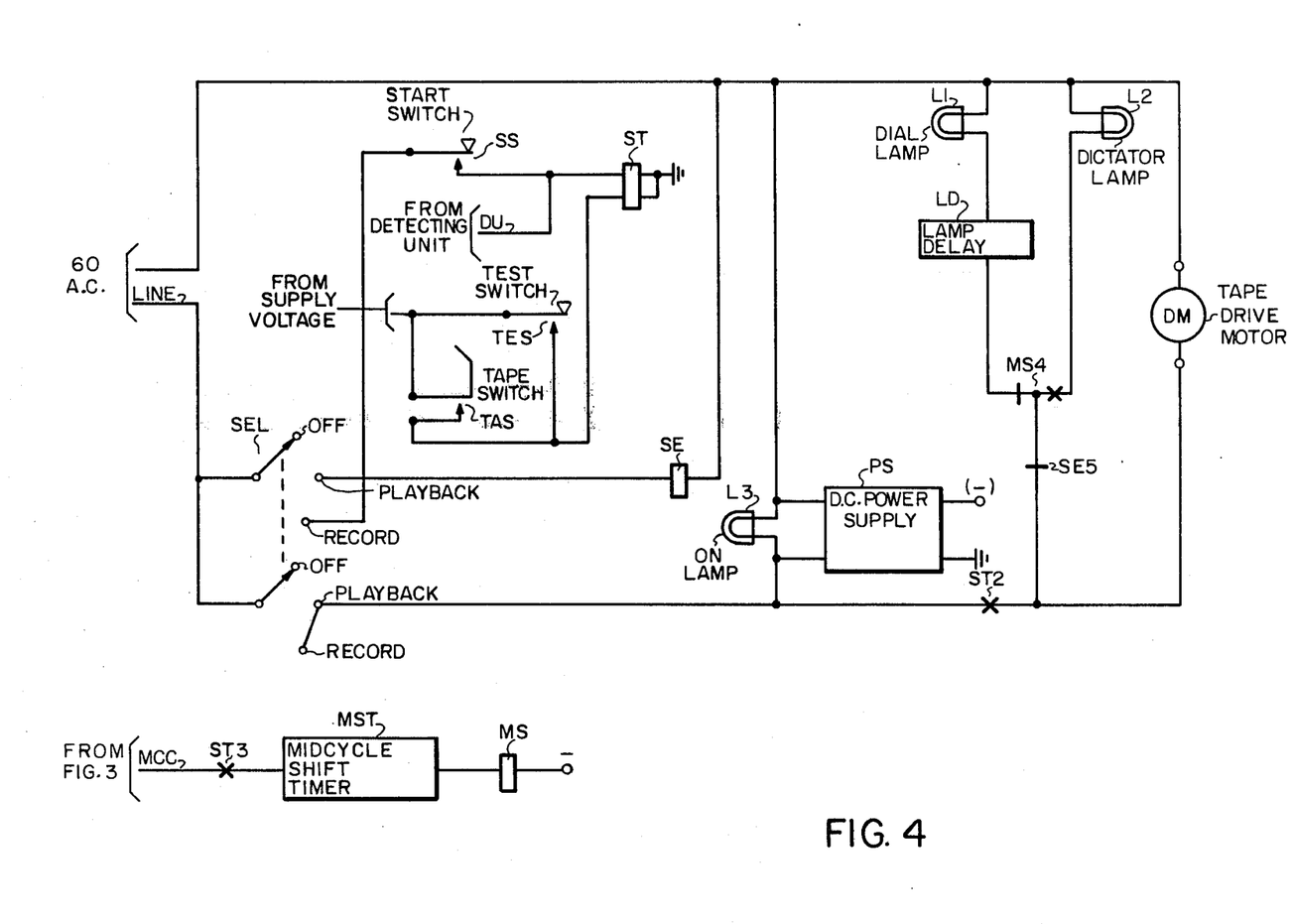
FIG. 4 illustrates the details of the control circuitry used in the embodiment shown.

FIG. 1 shows an overall block diagram, mostly in one-line presentation, of the circuit of the telephone warning unit described herein, this block diagram being supplemented by the details of the pushbutton dial circuit and its adapter circuit as illustrated in FIGS. 2 and 3, respectively, and by the details of the control circuit represented in FIG. 4.

Referring first to FIGS. 1 and 4, the unit has a magnetic tape T which is preferably an endless tape wound on a cartridge, not particularly shown, and is driven by a drive motor DM, FIG. 4. MH is a magnetic head or transducer used in connection with tape T both in recording and in playback, and TAS is a tape switch which, in a well known manner, cooperates with a slotted section provided in the tape and which, in the instant case, controls the lower winding of start relay ST, FIG. 4, as more fully explained hereinafter. Tape switch TAS which may be, for example, a microswitch, has been shown in both FIGS. 1 and 4 in its open condition which it assumes when it has dropped into the tape slot; when the feeler of switch TAS rides out of this slot, it contacts close.

As may be seen particularly from FIG. 2, the pushbutton dial is of the dual tone multifrequency type. The dial circuit comprises the dual tone multifrequency generator proper, consisting principally of a dual tank circuit 41 and an amplifier circuit 31 and it comprises, in addition, the contacts of a pushbutton set or matrix generically designated PBC in FIG. 1. One of the two tank circuits comprised in circuit 41 includes capacitor 45 and tapped inductor winding 42, and the other tank circuit includes capacitor 44 and the tapped winding 43 of another inductor. Amplifier circuit 31 primarily includes transistor 32; diode 40 from across the bias potentials for the base and emitter of transistor 32 are derived; inductor windings 34 and 35 which are closely coupled to winding 42; and inductor windings 36 and 37 which are closely coupled to winding 43.

The ten pushbuttons controlling this generator are located at the crosspoints of the matrix constituting the pushbutton set, not shown. By means of two sets of deplaceable crossbars, for example, (not shown) each of these pushbuttons upon depression actuates in a manner well known in the art, one of a first-coordinate group of contacts, 47-1, 47-2, 47-3 and 47-4, typically grouped along the horizontal edge portions of the matrix, for selecting a predetermined tap of winding 42 and simultaneously actuates one of a second-coordinate group of contacts, 46-5, 46-6, and 46-7, typically disposed along the vertical sides of the matrix, for selecting a given tap of winding 43. In this manner, in response to each pushbutton depression a pair of frequencies, one from a first or low group of four frequencies and another from a second or high group of three frequencies, is selected to provide a two-out-of-seven type of output. In addition, the depression of any one pushbutton also results, later in the pushbutton stroke, in the closure of a common contact 50 which, in interconnecting points A and B, acts to complete the powering circuit for transistor amplifier circuit 31 and to simultaneously close both tank circuits. Capacitors 44 and 45, in discharging through their respective inductances shock excite the generator for the independent generation of the selected low and high frequency, respectively, the corresponding oscillations being sustained by amplifier 31. All the pushbutton actuated contacts, including common contact 50, have been collectively designated as PBC in the block diagram FIG. 1. For the details of this pushbutton dial circuit, reference is made to the above mentioned Burns et al U.S. Pat. No. 3,284,577 which is hereby made a part of the present disclosure. Mechanically, the assembly (not shown herein) of the pushbutton dial may be of the type exemplified by Ham et al U.S. Pat. No. 3,479,470.

The adapter circuit shown in FIG. 3 supplements the pushbutton dial circuit of FIG. 2 for the purposes of the present invention, that is, it makes the generator circuit controllable not only from the above pushbutton contacts 47-1 to 47-4 and 46-5 to 46-7, but also from the seven contacts k1 to k4 and k5 to k7 of relays K1 to K7, respectively. Only the windings of relays K1 and K7 and their associated filters F1 and F7 have been shown in FIG. 1; the remaining five relays and filters are similarly connected. It will be clear from the foregoing that, more specifically, relays K1 to K4 function to control the selective regeneration of the low voice frequencies and that relays K5 to K7 control the selective regeneration of the high voice frequencies. Contacts k11 to k17 of relays K1 to K7 serve to duplicate the action of common pushbutton contact 50, FIG. 2, whenever any one of these relays is operated. With this in mind the K-relay contacts are adjusted so that each of contacts k1 to k7 closes slightly ahead of the closure of the corresponding one of contacts k11 to k17. To bring out, contacts k1 to k7 have been marked as preliminary or "X" contacts in FIG. 3. It may be mentioned at this point that the contacts of all the relays used in the illustrated embodiment, including those of relays K1 to K7, are shown in the drawings in the well known "detached contact" form. All the contacts of the K-relays have been collectively designated as KRC in FIG. 1. As regards filters F1 to F7 it is pointed out that these filters are preferably of the LC-type and that they are broadly tuned to provide a passband wide enough to insure proper selective operation of the associated relays even in the face of variations, within reasonable limits, of the picked up frequencies from their nominal value. T is a transformer by means of which the output of the dual tone multifrequency generator can be coupled to the Gen Out terminals, FIGS. 1 and 3.

Reverting now to FIGS. 1 and 4, SEL denotes a manual, two-level selector switch having the three positions Off, Playback and Record. It will be noted that the d.c. power supply PS and the On Lamp L3 are connected to the 60-cycle alternating current soure in both the Record and Playback positions of selector switch SEL. Lamp L3 and also dial lamp L1 and dictate lamp L2 referred to hereinbelow, may all be of the gas type. It will further be seen that start relay ST is operated from this alternating current source over its upperwinding with selector switch SEL in the Record position and with start switch SS operated; that this relay ST can alternatively be energized over this winding and conductor DU from the detecting unit, not shown, which serves to sense unstandard conditions for emergencies; and that this relay is also arranged to be held over its lower winding by way of tape switch TAS or to be operated over this lower winding by test switch TES. Start relay ST has three contacts of which contact ST1 closes a point in the loop circuit over telephone line L via the secondary winding of induction coil IC; contact ST2 connects the tape drive motor DM to the alternating current source in either the Record or Playback position of switch SEL and it also closes a point in the circuit of dial lamp L1 and dictate lamp L2; and contact ST3 prepares a circuit extending over conductor MCC, FIGS. 3 and 4, to midcycle shift timer MST and the winding of midcycle shift relay MS.

The midcycle shift timer, MST serves to monitor the interdigital period between successive dual tone bursts both in recording and in playback and causes the operation of midcycle shift relay MS when this period exceeds, say, about five seconds—as an indication that the dual tone recording or playback operation has been completed. More particularly relay MS, in operating during a recording operation, serves to switch the circuit from "dial", that is from the recording of the dual tones by means of the pushbutton dial, to "dictate," that is the dictation of the message by means of microphone M, FIG. 1; and in playback relay MS functions to switch the circuit from the picking up of the recorded dual tones to the picking up of the recorded message. Selector relay SE, FIG. 4, which is in the nature of a slave relay to manual selector switch SEL, is operated from the 60-cycle alternating current source on playback only and it functions to perform at its contacts SE1 to SE5, FIGS. 1 and 4, and at its SE' contacts, FIGS. 1 and 3, various switching operations for placing the circuit in condition for playback. It will be noted that contacts SE' are shown collectively in FIG. 1 and in detail in FIG. 3. Amplifier AA, FIG. 1, is used in connection with magnetic head MH both in recording and in playback, and amplifier AB provides power amplification in message playback.

OPERATION OF THE REPORTING UNIT

1. Recording Operation

This operation involves the recording on the endless magnetic tape T of the number of the supervisory station or the like to which unstandard conditions are to be reported, followed by the recording of the oral message to be delivered to the station. The operator will accordingly turn manual selector switch SEL, FIG. 4, from the Off position to the Record position. As a result d.c. power supply PS is energized from the 60-cycle commercial current source to supply negative battery and ground to the system and On lamp L3 is lit, as indicated above. The operator now depresses start switch SS for, say, approximately three seconds, and consequently start relay ST operates over its upper winding from the live side of the alternating current source to tape drive motor DM, thereby causing this motor to advance the tape, and, in parallel thereto, dial lamp L1 is lit through break contact SE5, the break side of the make-before-break contact MS4 and lamp delay LD. At contact ST3 a point in the circuit of midcycle shift timer MST and at contact ST1 a point in the loop circuit of telephone line L are closed.

After the tape has reached the end of its slotted section, tape switch TAS closes, thereby completing an obvious holding circuit for relay ST over its lower winding, so that this relay now remains operated independently of the condition of start switch SS. Lamp delay LD which may simply take the form of a diode and an RC filter, prevents dial lamp L1 from lighting before tape switch TAS has closed the aforementioned holding circuit for relay ST and the tape has come up to speed. The lighting of dial lamp L1 serves as an indication to the operator that he may now proceed with the dialing of the supervisory station's telephone number by means of the pushbutton dial, thereby to record this number on tape T with the aid of magnetic head MH. Since both the selector relay SE and the midcycle shift relay MS are unoperated at this time, it will be seen that the generator output at Gen Out is connected to magnetic head MH over a circuit including the break side of MS1, the break side of SE1, amplifier AA and the break side of contact SE2. Furthermore, it will be noted from FIG. 3 that with contacts SE'1 to SE'4 and SE'5 to SE'7 in their normal condition the taps of windings 42, 43 of the dual tone multifrequency generator are under control of pushbutton contacts 47-1 to 47-4 and 46-5 to 46-7, respectively. Also, with contact SE'8 of relay SE at normal, the MCC conductor, FIG. 3 and 4, is under the control of common pushbutton contact 50.

Thus, assuming that the pushbutton controlling the two contacts 47-1 and 46-5 is operated for the first digit of the telephone number, the extreme left terminal of winding 42 will be selected to determine the low frequency tone and the extreme left tap of winding 43 will be selected to determine the high frequency tone to be produced. At this time capacitor 45 charges from ground, FIG. 3, through all of winding 42, the break side of contact SE'1, contact 47-1, to the left terminal of capacitor 45, and from the right terminal of this capacitor through diode 40 and its series resistor, primary winding of transformer T, FIG. 3, to negative battery; and capacitor 44 similarly charges from ground through the first section of winding 43, break side of contact 46-5, capacitor 44, diode 40 and its series resistor, primary winding of transformer T, negative battery. Near the end of the pushbutton stroke common contact 50 also closes, with the result that both tank circuits are completed to cause the discharge of capacitor 45 over the tank circuit extending from the left terminal of capacitor 45 via contact 47-1, break of contact SE'1, all of winding 42, common contact 50, break of SE'8 to the right terminal of this capacitor; and cause the discharge of capacitor 44 over the other tank circuit which can be traced from the right terminal of capacitor 44, contact 46-5, break of contact SE'5, extreme left section of winding 43, common contact 50, break of SE'8 to the left terminal of this capacitor. Simultaneously the powering circuit for amplifying transistor 32 is closed from ground over common contact 50, the break side of SE'8, diode 40 and its series resistor, and the primary winding of transformer T to negative battery, thereby enabling amplifier 31 to sustain the oscillations set up by the aforementioned discharge of capacitors 45 and 44; and, in addition, conductor MCC is grounded, likewise by common contact 50 and via the break side of SE'8, thereby to start the midcycle shift timer MST by way of operated contact ST3, FIG. 3. In this fashion the dual tone corresponding to the first digit is recorded by magnetic head MH on moving magnetic tape T.

Each of the following digits—six in number if the telephone number to be called is a seven-digit number—is similarly recorded on magnetic tape T; that is, in response to each depression of a pushbutton, a corresponding pair of frequencies is recorded on tape T by means of the pushbutton dial and transducer MH.

The midcycle shift timer MST keeps relay MS from operating as long as the interval between successive pushbutton depressions as signaled to it via conductor MCC, does not exceed a predetermined time limit, say, 5 seconds. If no further pushbutton is depressed relay MS operates after the lapse of the aforementioned period, thereby operating its contacts MS1 to MS4. At contacts MS1 and MS2, the input terminal of amplifier AA is transferred from the output of the multifrequency generator to that of microphone M. The operation of contacts MS2 and MS3 has no effect at this time, but at contact MS4, FIG. 4, the live side of the alternating current source is transferred from dial lamp L1 to dictate lamp L2. The lighting of the dictate lamp serves as an indication to the operator that he may begin with the prerecording of the message to be automatically transmitted over the telephone line upon the occurrence of an emergency. The circuit for recording this message extends from microphone M via the make side of MS1, the break side of SEL, amplifier AA and the break side of SE2 to magnetic head MH.

From the foregoing it will be appreciated that at the time of completion of the last-mentioned recording operation both the series of dual tones required for automatically calling the supervisory station and also the message to be delivered to this station have been sequentially recorded on the same track of tape T. When in the further advancement of the tape the slotted section of the latter is again reached, the feeler of microswitch TAS falls back into the slot, thereby opening the hold circuit of start relay ST. With the release of relay ST the circuit of relay MS is opened at ST3, and at ST2 the tape drive motor DM is stopped and the circuit of dictate lamp L2 opened. The circuit has thus been returned to its normal condition except that with manual selector switch SEL still off-normal, d.c. power supply PS and ON lamp L3 are still operated.

2. Playback Operation

In order to condition the circuit for automatic playback the operator will now move the manual selector switch from Record to Playback so that selector relay SE operates over an obvious circuit. Relay SE in operating, at the make side of its contacts SE1 and SE2, connects the magnetic head to the seven filter and K-relay combinations over a path also including amplifier AA and the break side of MS2; at contact SE3 connects the output of the multifrequency generator through break contact MS3 to the primary winding of this induction coil IC; at contact SE4 prepares a point in the telephone loop circuit extending over the secondary winding of this induction coil; at SE5 disconnects the circuit of dial lamp L1 and dictate lamp L2; and at contacts SE'1 to SE'8 transfers the dual tone multifrequency generator from control by the pushbutton contacts, FIG. 2, to control by contacts k1 to k7 and k11 to k17, FIG. 3, of relays K1 to K7.

If and when the detector unit, not shown, detects an emergency with the reporting unit conditioned for playback as just described, start relay ST is automatically operated via conductor DU over its upper winding. Relay ST upon operating, at contact ST1 completes the previously prepared loop circuit over the telephone line L, thereby causing a switching equipment, such as a selector switch, to be seized in the central office to which the other end of the line is connected; at ST2 connects up the tape drive motor DM to cause the endless tape again to be advanced; and at ST3 again prepares the circuit for midcycle shift relay MS. After the tape has been sufficiently advanced so that the feeler of microswitch TAS rides out of the tape slot, start relay ST is held operated via this tape switch as explained above. Subsequently, when the location on the tape at which the pair of tones corresponding to the first digit of the supervisory station's number is recorded reaches the magnetic head the corresponding two K-relays are operated through their respective filters. In the assumed example relays K1 and K5, will be operated for the first digit over the following circuit: magnetic head MH, make of SEL, amplifier AA, make of SE2, break of MS2, filter F1 and winding of relay K1 to negative battery, and, in parallel thereto, filter F5 and winding of relay K5 to negative battery. As a result of the operation of relays K1 and K5, preliminary contacts k1 and k5, as well as contacts k11 and k15, FIG. 3, are closed. As will be clear from the above description, the closure of preliminary contact k1 connects capacitor 45 to the left end of winding 42 by way of the make of SE'1 and causes this capacitor to be charged; and the closure of preliminary contact k5 connects capacitor 44 to the extreme left tap of winding 43 via the make of SE'5 and causes the last-mentioned capacitor to be charged. The subsequent closure of contacts k11 and k15 has the following results: it completes the selected tank circuits for capacitors 45 and 44 to permit these capacitors to discharge over their respective circuits; it connects ground to the upper terminal of diode 40 to supply transistor 32 with bias potentials; and it simultaneously connects ground via the make side of SE'8 to conductor MCC and thence via contact ST3 to midcycle shift timer MST. It may be mentioned here in passing that instead of designing the K-relays for sequential operation of their contacts—k1 to k7 and k11 to k17, respectively—as indicated by the "x"-markings in FIG. 3, it is also possible to bring the same result about by a slave relay (not shown) common to relays K1 to K7. The single make contact of this slave relay would then be connected in FIG. 1 to take the place of contacts k11 to k17 and the last-mentioned contacts themselves would, instead, be used to operate the slave relay. In order to insure that the slave relay does not operate until both one of the K-relays, such as K1, of the "low" group and one of the K-relays, such as K5, of the "high" group have operated, the circuit of the winding of the slave relay would preferably include the parallel combination of contacts k11 to k14 and, in series therewith, the parallel combination of contacts k15 to k17. In the circuit as actually shown in FIG. 3 contacts k11 to k14 on the one hand and k15 to k17 on the other hand could also be connected in such a parallel-series arrangement for additional time safety, if desired.

As will be seen from FIG. 1, the pair of voice frequencies thus regenerated by the multifrequency generator under the control of relays K1 and K5 is impressed on the primary winding of induction coil IC by way of closed contacts SE3 and MS3, and, consequently, via the secondary winding of this coil on telephone line L by way of closed contacts SE4 and ST1. This pair of frequencies is thus transmitted over the line to the central office for the control of the dual tone multifrequency receiver therein (not shown). In the same fashion the other six pairs of voice frequencies previously recorded on magnetic tape T cause the operation of relays K1 to K7 in corresponding pairs which in turn causes the multifrequency generator to regenerate these pairs of tones and transmit them over the circuit just traced and telephone line L to the central office.

Each time a pair of relays K1 and K7 operates in response to a recorded pair of frequencies, ground is forwarded to the midcycle shift timer MST due to the closure of the corresponding pair of contacts from group k11 to k14 and group k15 to k17, respectively, which enables this timer to monitor the interdigital periods and hence the completion of the out dialing operation, at which time midcycle shift relay MS is allowed to operate. Relay MS at its contact MS3 disconnects the multifrequency generator from induction coil IC and at contact MS2 transfers the output of amplifier AA from the filter and K-relay combinations to the input of power amplifier AB. Thus as the tape is further advanced by drive motor DM the prerecorded oral message on the tape is now transmitted over the telephone line by way of the following circuit: magnetic head MH, make of SE1, amplifier AA, make of SE2, make of MS2, amplifier AB, induction coil IC and thence to telephone line L via closed contacts SE4 and ST1. At the distant supervisory station earlier reached by the out dialing of the DTMF signals as described, the call has been answered in the mean time, for example automatically by means of an automatic answering device, not shown, and the transmitted oral message can now be recorded by the last-mentioned answering device for later playback.

The playback cycle of the present reporting unit is completed when the feeler of tape switch TAS, FIG. 1, re-enters the slot in endless tape T, thereby bringing about the release of relay ST. Consequently relay MS, too, is released by the opening of contact ST3, the tape drive motor is stopped by the opening of ST2 and the telephone connection by way of line L is released due to the opening of contact ST1.

The aforementioned release of relay ST presupposes that the detecting unit, at the time of completion of the playback cycle, no longer forwards operating potential to the upper winding of this relay via conductor DU. If the operating potential just mentioned persists after completion of this playback cycle relay ST will remain operated and a new playback cycle will be automatically initiated and completed under the control of tape switch TAS. Provisions can be made in a well known manner to discontinue any further playback operation after a predetermined number of playback cycles have been completed. It is, of course, also possible to manually shut the reporting set down at any time by returning selector switch SEL to its OFF position.

On the other hand test switch TES may be used to operate relay ST when it is desired to initiate a playback cycle independently of the detecting circuit, thereby to verify that the reporting unit is in working order. Other facilities, not shown herein, can also be incorporated in this reporting set which enable the oral message to be verified by playing it back through the microphone.

From the foregoing description it will be appreciated that an automatic call transmitter, and especially a telephone reporting or warning unit, of the dual tone multifrequency type has been created which is reliable and yet extremely simple and inexpensive. This result has been brought about by using a DTMF generator first under the control of a pushbutton set to record, preferably on a magnetic tape also employed to record an oral message, a series of dual tones corresponding to a telephone number to be called, and then using this generator to regenerate pairs of voice frequencies corresponding to the recorded dual tones, under the control of switching means rendered frequency responsive by associated tuning means and selectively operated from the recorded tones upon playback, to transmit the telephone number over a line. If, according to the preferred embodiment described, filters are used to provide this tuning, then these filters, too, can be of simple design since they merely need to provide a relatively broad passband for insuring selective operation of the relays even though the dual tones, on playback of the recording medium, may depart somewhat from those originally produced in recording. Moreover, it is possible to use for the purpose of the invention a conventional DTMF or "Touch Calling" dial with a minimum of changes. In fact, as likewise demonstrated by the embodiment described, all that is necessary for this purpose is to bring out a number of leads of such a conventional dial and connect these leads to an extremely simple adapter circuit.

Although only a single embodiment of the invention has been described herein, it should be understood that numerous other modifications may be devised without departing from the spirit and scope of the invention. For example, because, as just explained, a substantially standard "Touch Calling" dial can be used in connection with the invention it becomes readily possible to use this dial also for direct manual dialing out on the telephone line or lines to which the automatic call transmitter is connected. Although this further service has not been specifically shown herein it will be clear that this feature can easily be incorporated in the unit with very minor changes. It is also possible to bring the midcycle shift about in a manner different from that disclosed herein.

What is claimed is:

1. A telephone reporting unit comprising:
   record/playback means operable in both record and playback modes;
   signal generating means connected to said record/playback means;
   mode selection means including circuit connections to said signal generating means and to said record/playback means, initially operated manually to condition said record/playback means for operation in the record mode;
   initiating means connected to said record/playback means, initially operated manually to render said record/playback means operable;
   said signal generating means manually operated to generate at least one voice frequency signal;
   said record/playback means operated in reponse to said generated voice frequency signal to record said signal;
   switching means including circuit connections to said mode selection means;
   said mode selection means further operated manually, to condition said record/playback means for operation in the playback mode, to disconnect said signal generating means from said record/playback means, to connect said switching means to said signal generating means and connect said record/playback means to said switching means;
   said initiating means further operated to render said record/playback means operated in the playback mode;
   said switching means operated in response to said recorded signal to operate said signal generating means to generate a voice frequency signal of the same frequency as said recorded signal;
   and midcycle shift means connected to said signal generating means, and connected to a microphone, said midcycle shift means initially operated, when said record/playback means are in the record mode in response to termination of voice frequency signals from said signal generating means, to disconnect said generating means from said record/playback means and connect said microphone to said record/playback means, and further operated when said record/playback means is in the playback mode, in response to termination of voice frequency signals from said signal generating means, to disconnect said switching means from said record/playback means.

2. A telephone reporting unit as claimed in claim 1 wherein said switching means comprise:
   at least one frequency responsive relay.

3. A telephone reporting unit as claimed in claim 1 wherein said switching means comprise:
   at least one relay;
   and a filter connected between said relay and said record/playback means, said filter tuned to the same frequency as said recorded signal.

4. A telephone reporting unit as claimed in claim 1 wherein said initiating means comprise:
   a relay connected to a manually operable associated switch and connectible to an external actuating circuit.

5. A telephone reporting unit as claimed in claim 1 wherein said record/playback means include:
   a magnetic tape;
   a tape drive mechanism;
   an amplifier including an input terminal and an output terminal, said amplifier input terminal initially connected to said signal generating means;
   a transducer in contact with said magnetic tape, initially connected to the output terminal of said amplifier, and in response to said mode selection means further operation said signal generating means disconnected from said amplifier input terminal and said transducer connected to said amplifier input terminal.

6. A telephone reporting unit as claimed in claim 1 wherein said signal generating means comprise:

a multifrequency oscillator circuit;
and a pushbutton controlled matrix connected to said oscillator for selectively operating said oscillator to generate selected voice frequency signals.

7. A telephone reporting unit as claimed in claim 1 wherein there is further included:
line coupling means connectible to a telephone line and initially connected to said record/playback means during said playback mode and disconnected from said record/playback means in response to operation of said midcycle shift means.

8. A telephone reporting unit as claimed in claim 7 wherein there is further included:
indicating means including circuit connections to said mode selection means and to said midcycle shift means, operable initially in response to said initial operation of said mode selection means to provide an indication that said signal generating means may be manually operated, and further operated in response to said midcycle shift means to provide an indication that said microphone may be used.

* * * * *